Figure 1:
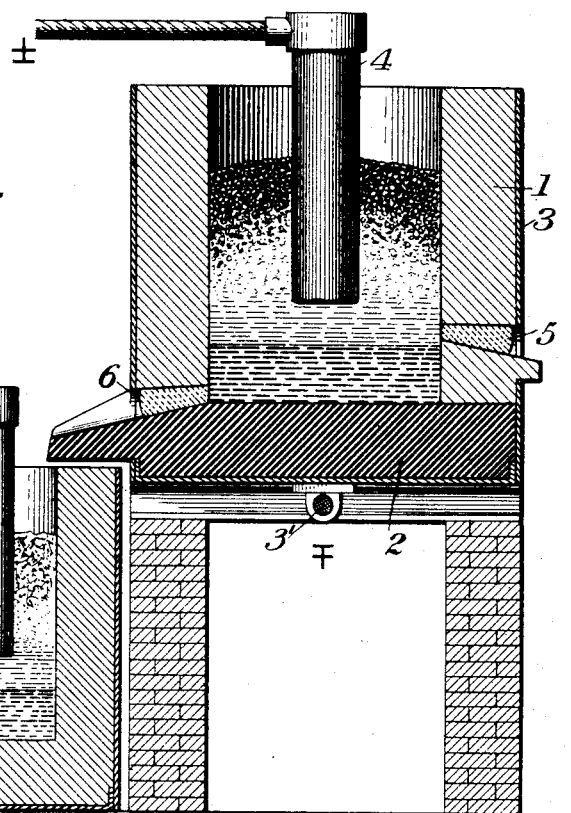

No. 790,396. PATENTED MAY 23, 1905.
E. F. PRICE.
PROCESS OF PRODUCING LOW CARBON METALS OR ALLOYS.
APPLICATION FILED NOV. 22, 1904.

Witnesses:
R A Balderson
J. B. Hill

Inventor:
Edgar F. Price,
by Byrnes & Townsend,
Att'ys.

No. 790,396. Patented May 23, 1905.

UNITED STATES PATENT OFFICE.

EDGAR F. PRICE, OF NIAGARA FALLS, NEW YORK.

PROCESS OF PRODUCING LOW-CARBON METALS OR ALLOYS.

SPECIFICATION forming part of Letters Patent No. 790,396, dated May 23, 1905.

Application filed November 22, 1904. Serial No. 233,886.

*To all whom it may concern:*

Be it known that I, EDGAR F. PRICE, a citizen of the United States, residing at Niagara Falls, in the county of Niagara and State of New York, have invented certain new and useful Improvements in Processes of Producing Low-Carbon Metals or Alloys, of which the following is a specification.

In the production of ferrochromium from chromite it is customary to introduce a small charge of the ore, carbon, and a flux into an electric furnace having sides and a hearth of carbon and to spring an arc between the hearth and a depending carbon electrode having its lower end embedded in the charge. A high-potential difference is usually maintained between the terminals of the furnace. As the ore is reduced a layer of the ferrochromium accumulates on the hearth covered by a layer of slag. The molten alloy is tapped out from time to time until the slag has increased to such an amount as to require removal. As the normal slag has a high fusion-point, a flux is added to render it more liquid and the remaining alloy and slag are finally run out through the metal tap-hole. The furnace is then charged anew and the process is repeated.

It is important that the ferrochromium produced should be low in carbon. The amount of carbon in the charge is therefore ordinarily kept at a minimum. On account of the low percentage of admixed carbon, however, highly-oxidizing gases are evolved in contact with the depending electrode, which is soon consumed and must be replaced. The air also acts rapidly on the hot electrode when the furnace is emptied by the removal of slag. Since the charge is a fairly good conductor of electricity, a thin layer only is maintained around the lower end of the depending electrode to prevent excessive shunting of current to the carbon sides of the furnace under the high applied potential. Much heat is therefore lost by radiation from the zone of reduction through the charge, while the electrode is insufficiently protected from oxidation by the air. This loss of heat greatly decreases the reduction efficiency of the furnace. Furthermore, the slag is not kept at a sufficiently high temperature to permit it to be tapped out, except by adding large amounts of flux, discontinuing the charging of ore, and employing the energy of the arc merely to liquefy the slag. The heat losses are also increased by the discontinuous mode of working both the furnace and the depending electrode cooling down when the furnace is emptied. It is also impracticable to effect a clean separation of the metal and slag by removing them successively through a single tap-hole.

According to the present invention the production of low-carbon ferrochromium and other metals and alloys is effected by a continuous operation comprising two stages. In the first stage an alloy with a relatively high percentage of carbon is produced by smelting a charge containing sufficient carbon to protect the carbon electrodes. The molten alloy is then run into a second furnace or into another compartment in the same furnace and is subjected to the action of a decarburizing agent. The preferred reagent is lime, and a layer of molten lime is preferably maintained on the surface of the molten alloy until the desired percentage of carbon has been withdrawn, the carbon reacting on the lime to produce calcium carbid which is separated from the purified alloy.

Suitable apparatus for carrying out the process is shown in the accompanying drawings, in which—

Figure 2:
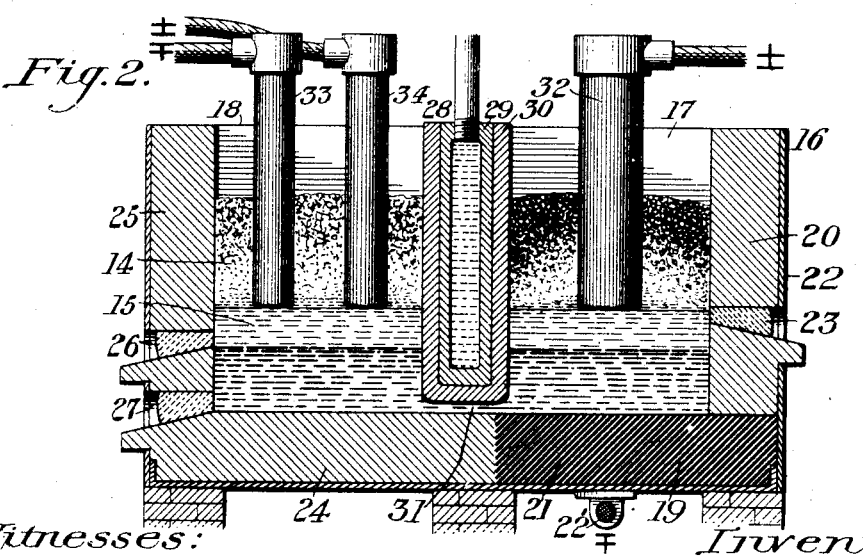

Figure 1 is a transverse vertical section of separate electric furnaces for reducing the ore and decarburizing the alloy, and Fig. 2 is a transverse vertical section of an electric furnace having separate communicating compartments for effecting the reduction and decarburization.

The reduction-furnace shown in Fig. 1 comprises sides 1, of refractory non-conducting material, such as chromite or magnesia, and a hearth 2, of carbon, surrounded by a metal casing 3, having an electric terminal 3'. The carbon hearth constitutes one electrode. The other electrode is a depending carbon rod 4. Tap-holes 5 6 extend through the side walls at different heights. In using this furnace to carry out the first stage of the process an arc is established between the depending electrode and the carbon hearth, and a small amount of the charge—for example, a mixture of chromite, coke, lime, and silica—is fed into the furnace. The charge preferably contains a considerable excess of carbon to protect the electrode 4 from oxidation. The furnace is then gradually filled until in its normal working condition the depending electrode is embedded in the charge. As the ore is reduced superposed layers of slag and ferrochromium collect in the bottom of the furnace and are withdrawn from time to time through the tap-holes 5 6, the alloy being run into the decarburizing-furnace 7. More of the charge mixture is then fed into the reduction-furnace. The furnace 7 comprises a body 8, of refractory material, preferably chromite or magnesia, surrounded by a metal casing 9. Superposed tap-holes 10 11 extend from the lower part of the furnace. Carbon-rod electrodes 12 13 of opposite polarity depend into the furnace. In the second stage of the process after a layer of the high-carbon alloy has been run into the furnace 7 a body 14 of the lime or other decarburizing agent is fed into the furnace upon the alloy and a portion of the lime is melted by an electric current and maintained as a molten layer 15 upon the alloy. The carbon of the alloy is thereby gradually withdrawn, reacting on the lime to produce calcium carbid. As decarburization progresses the calcium carbid is withdrawn at intervals through the tap-hole 10 and the purified alloy through the tap-hole 11. More of the high-carbon alloy is then supplied from the reduction-furnace, percolating through the lime to the bottom of the furnace, and the body of lime is replenished as required. In case it is not desired to entirely decarburize the product portions of the high-carbon alloy may be run into the furnace 7 from time to time and the body of metal allowed to accumulate, portions being withdrawn when the carbon has been reduced to the desired percentage. By maintaining a considerable pool of metal in the furnace 7 portions of the high-carbon alloy may be frequently added and portions of the product withdrawn without materially changing the carbon contents.

The furnace 16 (shown in Fig. 2) has separate communicating compartments 17 18 for reducing the ore and decarburizing the alloy. The reduction-compartment 17 has non-conducting sides 20 and a hearth 21, of carbon, surrounded by a metal casing 22, having an electric terminal 22'. The carbon hearth constitutes one electrode. A tap-hole 23 for slag extends through the end wall. The decarburizing-compartment 18 has a bottom 24 and outer walls 25, of non-conducting material, preferably chromite or magnesia. Superposed lateral tap-holes 26 27 extend through the end wall. The compartments 17 18 are partially separated by a transverse wall 28, which depends nearly to the bottom of the furnace. This wall preferably consists of a steel casting 29, having a chamber for the circulation of water and an outer facing 30 of refractory material. A passage 31 beneath the wall 28 connects the compartments 17 18. A carbon-rod electrode 32 of opposite polarity to the terminal 22' depends into the reduction-compartment. Two carbon-rod electrodes 33 34 of opposite polarity depend into the decarburizing-compartment. In using this furnace to carry out the process the charge of ore, carbon, and flux is smelted in the compartment 17 by an electric current passing between the electrode 32 and the carbon hearth 21. The resulting slag is withdrawn from time to time through the tap-hole 23, and the high-carbon alloy runs through the passage 31 into the compartment 18. The decarburization of the alloy in this compartment is effected precisely as in the separate furnace 7, heretofore described, a body of the decarburizing agent being supported upon the alloy and heated by an electric current. The calcium carbid is withdrawn through the tap-hole 26 and the purified alloy through the tap-hole 27. The process is carried out in a continuous manner, the charge mixture being fed into the compartment 17 and lime into the compartment 18, and the slag, carbon, and purified alloy being withdrawn through the tap-holes 23 26 27 as required.

The process has been described in connection with the production of ferrochromium, but is applicable to the production of various low-carbon metals and alloys. It enables a metal containing a minimum or predetermined low percentage of carbon to be continuously produced at a relatively low cost. By employing a charge containing an excess of carbon and by embedding the depending electrode in a considerable body of the charge the ordinary reduction-furnace may be employed and the usual loss by oxidation of the carbon electrodes largely prevented. The carbon in the alloy is then removed or reduced to the desired figure by a cheap reagent and in a furnace having non-carbon walls, the heat in the high-carbon alloy being retained by running it in a molten condition into the decarburizing-furnace.

I claim—

1. The process of producing low-carbon metals or alloys, which consists in first producing a material relatively high in carbon, removing the molten high-carbon product from the zone of reduction, treating it with a decarburizing agent and producing a non-gaseous carburized by-product, and separating the by-product from the low-carbon product, as set forth.

2. The process of continuously producing low-carbon metals or alloys, which consists in first producing a material relatively high in carbon, running the molten high-carbon product into a separate chamber, treating it with a decarburizing agent and producing a non-gaseous carburized by-product, and separating the by-product from the low-carbon product, as set forth.

3. The process of continuously producing low-carbon metals or alloys, which consists in first producing a material relatively high in carbon, running the molten high-carbon product into a separate chamber, electrically heating it in the presence of a decarburizing agent and producing a non-gaseous carburized by-product, and separating the by-product from the low-carbon product, as set forth.

4. The process of continuously producing low-carbon metals or alloys, which consists in first producing a material relatively high in carbon by electrically smelting a charge containing an excess of carbon, separating the resulting slag, running the molten high-carbon product into a separate chamber, electrically heating it in the presence of a decarburizing agent and producing a non-gaseous carburized by-product, and separating the by-product from the low-carbon product, as set forth.

5. The process of continuously producing low-carbon metals or alloys, which consists in first producing a material relatively high in carbon by electrically smelting a charge containing an excess of carbon, separating the resulting slag, running the molten high-carbon product into a separate chamber, electrically heating it in the presence of a decarburizing agent and producing a non-gaseous carburized by-product, separating the by-product from the low-carbon product, and supplying the charge mixture and decarburizing agent and withdrawing the slag, by-product and low-carbon product as required, as set forth.

6. The process of continuously producing low-carbon metals or alloys, which consists in first producing a material relatively high in carbon by electrically smelting, with carbon electrodes, a charge containing an excess of carbon, protecting the electrodes from oxidation by a considerable body of the charge, separating the resulting slag, running the high-carbon product into a separate chamber having non-carbon walls, treating it with a decarburizing agent and producing a non-gaseous carburized by-product, separating the by-product from the low-carbon product, and supplying the charge mixture and decarburizing agent and withdrawing the slag, by-product and low-carbon product as required, as set forth.

7. The process of continuously producing low-carbon metals or alloys, which consists in first producing a material relatively high in carbon, running the molten high-carbon product into a separate chamber and treating it with lime, and separating the resulting calcium carbid from the low-carbon product, as set forth.

8. The process of continuously producing low-carbon metals or alloys, which consists in first producing a material relatively high in carbon, running the molten high-carbon product into a separate chamber and electrically heating it in the presence of lime, and separating the resulting calcium carbid from the low-carbon product, as set forth.

9. The process of continuously producing low-carbon metals or alloys, which consists in first producing a material relatively high in carbon by electrically smelting a charge containing an excess of carbon, separating the resulting slag, running the molten high-carbon product into a separate chamber and electrically heating it in the presence of lime, and separating the resulting calcium carbid from the low-carbon product, as set forth.

10. The process of continuously producing low-carbon metals or alloys, which consists in first producing a material relatively high in carbon by electrically smelting a charge containing an excess of carbon, separating the resulting slag, running the molten high-carbon product into a separate chamber and electrically heating it in the presence of lime, separating the resulting calcium carbid from the low-carbon product, and supplying the charge mixture and lime and withdrawing the slag, calcium carbid and low-carbon product as required, as set forth.

11. The process of continuously producing low-carbon metals or alloys, which consists in first producing a material relatively high in carbon by electrically smelting, with carbon electrodes, a charge containing an excess of carbon, protecting the electrodes from oxidation by a considerable body of the charge, separating the resulting slag, running the high-carbon product into a separate chamber having non-carbon walls and treating it with lime, separating the resulting calcium carbid from the low-carbon product, and supplying the charge mixture and lime and withdrawing the slag, calcium carbid and low-carbon product as required, as set forth.

12. The process of producing low-carbon ferrochromium, which consists in first producing ferrochromium relatively high in carbon, removing the molten high-carbon product from the zone of reduction and treating it with a decarburizing agent, and separating the carburized reagent from the low-carbon product, as set forth.

13. The process of continuously producing low-carbon ferrochromium, which consists in first producing ferrochromium relatively high in carbon, running the molten high-carbon product into a separate chamber and treating it with a decarburizing agent, and separating the carburized reagent from the low-carbon product, as set forth.

14. The process of continuously producing low-carbon ferrochromium, which consists in first producing ferrochromium relatively high in carbon, running the molten high-carbon product into a separate chamber and electrically heating it in the presence of a decarburizing agent, and separating the carburized reagent from the low-carbon product, as set forth.

15. The process of continuously producing low-carbon ferrochromium, which consists in first producing ferrochromium relatively high in carbon by electrically smelting a charge containing an excess of carbon, separating the resulting slag, running the molten high-carbon product into a separate chamber and electrically heating it in the presence of a decarburizing agent, and separating the carburized reagent from the low-carbon product, as set forth.

16. The process of continuously producing low-carbon ferrochromium, which consists in first producing ferrochromium relatively high in carbon by electrically smelting a charge containing an excess of carbon, separating the resulting slag, running the molten high-carbon product into a separate chamber and electrically heating it in the presence of a decarburizing agent, separating the carburized reagent from the low-carbon product, and supplying the charge mixture and decarburizing agent and withdrawing the slag, carburized reagent and low-carbon product as required, as set forth.

17. The process of continuously producing low-carbon ferrochromium, which consists in first producing ferrochromium relatively high in carbon by electrically smelting, with carbon electrodes, a charge containing an excess of carbon, protecting the electrodes from oxidation by a considerable body of the charge, separating the resulting slag, running the high-carbon product into a separate chamber having non-carbon walls and treating it with a decarburizing agent, separating the carburized reagent from the low-carbon product, and supplying the charge mixture and decarburizing agent and withdrawing the slag, carburized reagent and low-carbon product as required, as set forth.

18. The process of continuously producing low-carbon ferrochromium, which consists in first producing ferrochromium relatively high in carbon by electrically smelting a charge containing an excess of carbon, separating the resulting slag, running the high-carbon product into a separate chamber and treating it with lime, separating the resulting calcium carbid from the low-carbon product, and supplying the charge mixture and lime and withdrawing the slag, calcium carbid and low-carbon product as required, as set forth.

19. The process of continuously producing low-carbon ferrochromium, which consists in first producing ferrochromium relatively high in carbon by electrically smelting, with carbon electrodes, a charge containing an excess of carbon, protecting the electrodes from oxidation by a considerable body of the charge, separating the resulting slag, running the high-carbon product into a separate chamber having non-carbon walls and treating it with lime, separating the resulting calcium carbid from the low-carbon product, and supplying the charge mixture and lime and withdrawing the slag, calcium carbid and low-carbon product as required, as set forth.

In testimony whereof I affix my signature in presence of two witnesses.

EDGAR F. PRICE.

Witnesses:
C. C. MOSHER,
D. BURGESS.